(12) United States Patent
Alexander et al.

(10) Patent No.: US 9,674,566 B2
(45) Date of Patent: Jun. 6, 2017

(54) UNIQUE GROUPING OF COMMUNICATION SOURCES

(71) Applicant: CHARTER COMMUNICATIONS OPERATING, LLC, St. Louis, MO (US)

(72) Inventors: James Herbert Alexander, Denver, CO (US); Timothy Paul Germain, Morrison, CO (US); Michael P Malecek, Sunset Hills, MO (US); Brian Clements, Castle Rock, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 24 days.

(21) Appl. No.: 14/634,040

(22) Filed: Feb. 27, 2015

(65) Prior Publication Data

US 2016/0255386 A1    Sep. 1, 2016

(51) Int. Cl.
| | |
|---|---|
| *H04N 21/2665* | (2011.01) |
| *H04N 21/8355* | (2011.01) |
| *H04N 21/4627* | (2011.01) |
| *H04N 21/254* | (2011.01) |
| *H04N 21/2543* | (2011.01) |

(52) U.S. Cl.
CPC ..... *H04N 21/2665* (2013.01); *H04N 21/2541* (2013.01); *H04N 21/25435* (2013.01); *H04N 21/4627* (2013.01); *H04N 21/8355* (2013.01)

(58) Field of Classification Search
CPC .......... H04N 21/2665; H04N 21/4627; H04N 21/25435; H04N 21/2541; H04N 21/2543; H04N 21/26225
See application file for complete search history.

(56) References Cited

U.S. PATENT DOCUMENTS

| | | | |
|---|---|---|---|
| 2013/0254820 A1* | 9/2013 | Bonomi | H04H 60/72 725/110 |
| 2014/0074801 A1* | 3/2014 | Kacher | G06F 17/30303 707/692 |
| 2014/0237500 A1* | 8/2014 | Joao | H04N 21/25891 725/25 |

* cited by examiner

*Primary Examiner* — Benjamin R Bruckart
*Assistant Examiner* — Akshay Doshi
(74) *Attorney, Agent, or Firm* — Meagher Emanuel Laks Goldberg & Liao, LLP

(57) ABSTRACT

The specification and drawings present a new method, apparatus and software related product (e.g., a computer readable memory or storage device) for optimization of authorization codes (or identifications, IDs) for delivery of multimedia content such as video channels using unique grouping of sources (to be delivered to users) into content packages assigned new authorization codes. Then each original content package may be represented by a combination of uniquely grouped packages assigned with a plurality of corresponding new codes.

17 Claims, 7 Drawing Sheets

| Unique Grouping | Source |
|---|---|
| UG 1 | ESPN, ESPN 2, ESPN 3 |
| UG 2 | ESPN Deportes |
| UG 3 | ESPN News |
| UG 4 | CNN, Fox News, MSNBC |
| UG 5 | Telemundo, Univision |
| UG 6 | Local 1, Local 2, Local 3 |
| UG 7 | Home & Garden, AMC, TMC |
| UG 8 | Spike |
| UG 9 | Military Channel |
| UG 10 | Christian Network |
| UG 11 | The Jesus Channel |

| Code | Sources | UG sequence |
|---|---|---|
| AA | ESPN, ESPN 2, ESPN 3, ESPN Desportes, ESPN News | UG1, UG2, UG3 |
| BB | CNN, FOX News, MSNBC, ESPN News | UG 4, UG 3 |
| CC | Telemundo, Univision, ESPN Desportes | UG5, UG2 |
| DD | Local 1, Local 2, Local 3 | UG 6 |
| EE | Home & Garden, AMC, TMC, Christian Network, SPIKE | UG 7, UG 8, UG 10 |
| FF | Christian Network, The Jesus Channel | UG 10, UG 11 |
| GG | Military Channel, SPIKE | UG 8, UG9 |

Figure 2b

| Unique Grouping | Source |
|---|---|
| UG 1 | ESPN, ESPN 2, ESPN 3 |
| UG 2 | ESPN Desportes |
| UG 3 | ESPN News |
| UG 4 | CNN, Fox News, MSNBC |
| UG 5 | Telemundo, Univision |
| UG 6 | Local 1, Local 2, Local 3 |
| UG 7 | Home & Garden, AMC, TMC |
| UG 8 | Spike |
| UG 9 | Military Channel |
| UG 10 | Christian Network |
| UG 11 | The Jesus Channel |

Figure 2c

UNIQUE GROUPING OF COMMUNICATION SOURCES

FIELD OF THE INVENTION

The invention relates to multimedia communications and, more particularly but not exclusively, optimization of authorization codes/IDs for delivery of multimedia content such as video channels by unique grouping of sources to be delivered to users.

BACKGROUND

Cable billing systems have a huge number of Codes representing the packages of video that are authorized for a subscriber to view on a set-top box (STB). Each cable location may have their own set of codes or rely on a generic set of codes that are used across the company. Each video package may contain one or more video offerings (i.e., channels or sources).

A typical billing system, in a company delivering a multimedia content to users, may have thousands of rate codes that are used to allow access to video, like a movie package, a sports package, etc. Each video package may contain one or more video offerings (e.g., channels or sources). Some packages may have many numbers of Video Channels in them.

Over the years as the company changes pricing packages to create promotions, new codes are added, but the core video channels often may stay the same in different packages.

For example a typical cable company usually offers about 4-7 packages to customers from basic to premium (basic has fewer channels, premium has more channels). Each has a different grouping of the channels available on the network. Then there are special purpose additions like a sports package, a French-language packages and the like. Over the years the practice has been to create a new package whenever there is a big change in the way the company wants to create annual promotions, so that a total number of different packages offered to customers/users may reach several thousands.

SUMMARY

Various deficiencies in the prior art are addressed by using a method, apparatus and software related product according to embodiments disclosed herein.

According to a first aspect of the invention, a method performed by a network computing device, comprising: identifying a plurality of original content packages assigned with a plurality of original codes, each original content package having an original code of the plurality of original codes and comprising one or more sources deliverable to users by a content provider; identifying, among the plurality of original content packages, groups of duplicate content packages, where the duplicate content packages being assigned different original codes; assigning one reference code to each of the groups comprising duplicate content packages, so that all duplicate content packages in each group being assigned only one reference code; forming a plurality of non-duplicate content packages including non-duplicate content packages with the original codes and with the assigned reference codes; further identifying overlapping sources in the formed plurality of non-duplicate content packages; and forming a plurality of new content packages assigned with a plurality of new codes, where each new content package having a new code and the plurality of new content packages comprise content packages having only the overlapping sources and only non-overlapping sources. Moreover, the method may further comprise: providing a unified map comprising two maps: a first map indicating a relationship between the groups comprising duplicate original content packages being assigned different original codes, and the reference codes assigned to the corresponding groups comprising duplicate content packages, and a second map indicating a relationship between the plurality of original and non-duplicate content packages assigned with the plurality of original and reference codes, and the plurality of new content packages assigned with the plurality of new codes, the unified map being for delivery by the content provider of corresponding sources to corresponding users using the plurality of new codes. Still further, the method may further comprise: receiving, from a billing system, an original code for an original content package comprising a plurality of sources to be delivered to a user; determining, using said map, content packages assigned with corresponding new codes out of the plurality of new codes, said content packages together being out of the plurality of new content packages, where the plurality of content packages comprising said plurality of sources comprised in the original content package; and providing said corresponding new codes to a set top box (STB) of said user for getting permission for decrypting information received from any of the plurality of sources comprised in the original content package.

According to a second aspect of the invention, a method, comprising: receiving, by a translation computing device from a billing system in a content provider, an original code for an original content package comprising a plurality of sources to be delivered to a user; determining, using a unified map, content packages assigned with corresponding new codes out of the plurality of new codes, said content packages being out of a plurality of new content packages, where the content packages together comprising said plurality of sources comprised in the original content package, the unified map comprising at least two maps: a first map indicating a relationship between groups comprising duplicate original content packages being assigned different original codes, and the reference codes assigned to the corresponding groups comprising duplicate content packages, so that all duplicate content packages in each group being assigned only one reference code, and a second map indicating a relationship between a plurality of original and non-duplicate content packages assigned with a plurality of original and reference codes, and the plurality of new content packages assigned with the plurality of new codes; and providing said corresponding new codes to a set top box (STB) of said user for getting permission for decrypting information received from any of the plurality of sources provided by the content provider.

According to a third aspect of the invention, an apparatus comprising: a processor; a storage medium for tangibly storing thereon program logic for execution by the processor, the program logic comprising: logic to identify a plurality of original content packages assigned with a plurality of original codes, each original content package having an original code of the plurality of original codes and comprising one or more sources deliverable to users by a content provider; logic to identify, among the plurality of original content packages, groups of duplicate content packages, where the duplicate content packages being assigned different original codes; logic to assign one reference code to each of the groups comprising duplicate content packages, so that all duplicate content packages in each group being assigned only one reference code; logic to form a plurality of non-duplicate content packages including non-duplicate content packages with the original codes and with the assigned reference codes; logic to further identify overlapping sources in the formed plurality of non-duplicate content packages; and logic to form a plurality of new content packages assigned with a plurality of new codes, where each new content package having a new code and the plurality of new content packages comprise content packages having only the overlapping sources and only non-overlapping sources.

According to a fourth aspect of the invention, an apparatus comprising: a processor; a storage medium for tangibly storing thereon program logic for execution by the processor, the program logic comprising: logic to receive, by a translation computing device from a billing system in a content provider, an original code for an original content package comprising a plurality of sources to be delivered to a user; logic to determine, using a unified map, content packages assigned with corresponding new codes out of the plurality of new codes, said content packages being out of a plurality of new content packages, where the content packages together comprising said plurality of sources comprised in the original content package, the unified map comprising at least two maps: a first map indicating a relationship between groups comprising duplicate original content packages being assigned different original codes, and the reference codes assigned to the corresponding groups comprising duplicate content packages, so that all duplicate content packages in each group being assigned only one reference code, and a second map indicating a relationship between a plurality of original and non-duplicate content packages assigned with a plurality of original and reference codes, and the plurality of new content packages assigned with the plurality of new codes; and logic to provide said corresponding new codes to a set top box (STB) of said user for getting permission for decrypting information received from any of the plurality of sources any of the plurality of sources and provided by the content provider.

According to a fifth aspect of the invention, a non-transitory computer readable storage medium tangibly storing computer program instructions capable of being executed by a computer processor, the computer program instructions defining code for: method, comprising: identifying a plurality of original content packages assigned with a plurality of original codes, each original content package having an original code of the plurality of original codes and comprising one or more sources deliverable to users by a content provider; identifying, among the plurality of original content packages, groups of duplicate content packages, where the duplicate content packages being assigned different original codes; assigning one reference code to each of the groups comprising duplicate content packages, so that all duplicate content packages in each group being assigned only one reference code; forming a plurality of non-duplicate content packages including non-duplicate content packages with the original codes and with the assigned reference codes; further identifying overlapping sources in the formed plurality of non-duplicate content packages; and forming a plurality of new content packages assigned with a plurality of new codes, where each new content package having a new code and the plurality of new content packages comprise content packages having only the overlapping sources and only non-overlapping sources.

According to a sixth aspect of the invention, anon-transitory computer readable storage medium tangibly storing computer program instructions capable of being executed by a computer processor, the computer program instructions defining code for: method, comprising: receiving, by a translation computing device from a billing system in a content provider, an original code for an original content package comprising a plurality of sources to be delivered to a user; determining, using a unified map, content packages assigned with corresponding new codes out of the plurality of new codes, said content packages being out of a plurality of new content packages, where the content packages together comprising said plurality of sources comprised in the original content package, the unified map comprising at least two maps: a first map indicating a relationship between groups comprising duplicate original content packages being assigned different original codes, and the reference codes assigned to the corresponding groups comprising duplicate content packages, so that all duplicate content packages in each group being assigned only one reference code, and a second map indicating a relationship between a plurality of original and non-duplicate content packages assigned with a plurality of original and reference codes, and the plurality of new content packages assigned with the plurality of new codes; and providing said corresponding new codes to a set top box (STB) of said user for getting permission for decrypting information received from any of the plurality of sources provided by the content provider.

BRIEF DESCRIPTION OF THE DRAWINGS

The teachings of the present invention can be readily understood by considering the following detailed description in conjunction with the accompanying drawings, in which:

FIGS. 2a-2c are diagrams demonstrating example for identifying corresponding overlapping and non-overlapping packages with assigned new codes after duplicate packages are identified, according to an embodiment;

FIG. 3 is a flow chart demonstrating implementation by a SRM of an embodiment described herein;

To facilitate understanding, identical reference numerals have been used, where possible, to designate identical elements that are common to the figures.

DETAILED DESCRIPTION

Figure 1A:
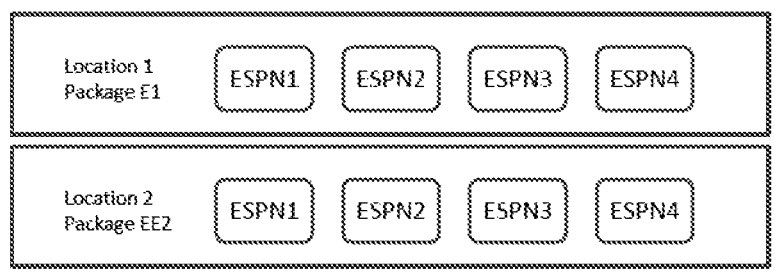
FIG. 1a is a diagram demonstrating an example of duplicate packages having different alphanumeric codes, used for implementing an embodiment described herein.
Figure 1B:
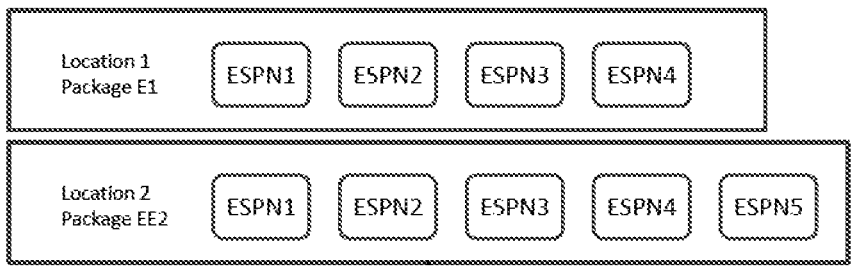
FIG. 1b is a diagram demonstrating an example of similar packages having different alphanumeric codes, used for implementing an embodiment described herein.

Over time a growing number of codes for content packages (e.g., comprising sources like cable video channels) to represent all available/used packages by a content provider (e.g., a cable provider company, a satellite provider company and the like) may be overwhelming, for example, due to a byte size limit, etc. Therefore, according to various embodiments, a method, apparatus and software related product (e.g., a computer readable memory or storage device) are presented for optimization of authorization codes (or identifications, IDs) for delivery of multimedia content such as video channels using unique grouping of sources (to be delivered to users) into content packages assigned new authorization codes. Then each original content package may be represented by a combination of uniquely grouped packages assigned with a plurality of corresponding new codes. This can reduce a number of codes to be tracked in the content provider system for delivering a great number of the original content packages.

According to a first embodiment, a network computing device, e.g., located at a data center, a head end, a cloud, a back office, a hub, or another network element of a network such as cable provider, satellite provider and/or the like, may perform a method which can start with identifying a plurality of original content packages assigned with a plurality of original codes, each original content package having an original code of the plurality of original codes and comprising one or more sources deliverable to users by a content provider. Each of the plurality of original codes may comprise, for example, a few (e.g., two) alphanumeric characters.

The sources in the plurality of original content packages may be multi-media channels, video channels and/or networks (e.g., HBO West, HBO East, NBC, and the like). Sometimes a "network" may comprise "sources". The content provider may be a cable provider, a satellite provider, a combination of cable and satellite providers, and/or other existing and emerging pay TV systems.

The method can further comprise identifying, among the plurality of original content packages, groups of duplicate content packages, when the duplicate content packages being assigned different original codes, which is followed by assigning one reference code to each of the groups comprising duplicate content packages, so that all duplicate content packages in each group being assigned only one (unique) reference code. Thus, a plurality of non-duplicate content packages can be formed. These non-duplicate content packages may include non-duplicate content packages assigned with the original codes and with the assigned reference codes. As an example, each of the plurality of new codes may comprise a few (e.g., two) alphanumeric characters.

Still further, the method can comprise further identifying, among the formed plurality of non-duplicate content packages, overlapping sources, and forming a plurality of new content packages assigned with a plurality of new (unique) codes, where each new content package having a new code, the plurality of new content packages comprising content packages having only overlapping sources and content packages having only non-overlapping sources, wherein each of the new content packages comprises one or more sources from only one original content package. As an example, each of the plurality of new codes comprise a few (e.g., two) alphanumeric characters.

Then, based on the identified plurality of new content packages with the assigned plurality of new codes, the network computing device can further provide a unified map comprising two maps: a first map indicating a relationship between the groups comprising duplicate original content packages being assigned different original codes, and the reference codes assigned to the corresponding groups comprising duplicate content packages, and a second map indicating a relationship between the plurality of original and non-duplicate content packages assigned with the plurality of original and reference codes, and the plurality of new content packages (with only overlapping or only non-overlapping sources) assigned with the plurality of new codes and derived from the plurality of the original non-duplicate content packages. As explained herein. The unified map can be used for delivery by the content provider of corresponding sources to corresponding users using the plurality of new codes as further explained herein.

For example, this unified map can be stored in a memory of and used by a translation computing device in the content provider system (network) as follows. According to a second embodiment, after receiving from a billing system, an original code for an original content package comprising a plurality of sources to be delivered to a user (e.g., ordered/requested by the user), the translation computing device can determine, using this stored unified map, content packages assigned with corresponding new codes out of the plurality of new codes, said content packages being out of the plurality of new content packages, where these content packages together comprising the plurality of sources comprised in the original content package. Then the corresponding new codes can be provided to a set top box (STB) of the user for getting permission to decrypt information received from any of the plurality of sources comprised in the original content package and provided by the content provider (e.g., by a cable company).

Furthermore, the translation computing device used for implementing the second embodiment, may be the same device as the computing device used for implementing the first embodiment, described above, or it can be a different device located at the same or at a different network element. The translation computing device may be located at a data center, a head end, a cloud, a back office, a hub, or another network element in a network such as a cable provider, a satellite provider and/or the like. In some applications, the translation computing device may be located at the STB as well.

In the content below, a more detailed account for embodiments described herein is provided in reference to FIGS. 1-6.

Quite often, a code may be used at a local cable market that differs from another code in another cable market that contains the same video offerings. Such scenario involving duplicate packages with different alphanumeric codes E1 and EE2 is demonstrated in FIG. 1. Assigning one code for all identical packages may be a first step performed by the network computing device in the first embodiment as described above. Thus, in order to achieve a reduction in the overall number of package codes, all the combinations of video services across the enterprise must be analyzed. All the groupings that are identical each of which have a unique package code should be referenced as a single group.

TABLE 1

Assigning one unique code to identical packages at different locations.

| New Unique Package Code | Location | Package Code | Video sources |
|---|---|---|---|
| N-S1 | Location-A | S1 | ESPN1, ESPN2 |
| N-S1 | Location-B | S23 | ESPN1, ESPN2 |
| N-S1 | Location-C | SS2 | ESPN1, ESPN2 |

In a scenario demonstrated in Table 1, 3 package codes (S1, S23, and SS2) have been reduced into a single package code (N-S1). A translation table will map location-A/S1 into N-S1, location-B/S23 into N-S1 and location-C/SS2 into N-S1, and vice versa.

There are other possible cases where two local packages are similar. One package may be a superset of the other. The example of similar packages with alphanumeric codes E1 and EE2 is shown in FIG. 2. Channels ESPN1-ESPN4 are common in both locations. Only ESPN5 channel in the second location makes a difference between two packages E1 and EE2.

These codes (as demonstrated in FIG. 2) often overlap and can be redundant across the footprint of a large cable provider. Having the large number of combinations of local packages that are specific to each local site, multiplied by the large number of local sites, can make the total number of package codes very large (e.g., on the order of thousands). In certain situations there can be too many codes for a system's capacity. The embodiments described herein describe a procedure for changing the codes into an alternate set of codes that more efficiently represent the combinations of possibilities, for example, by identifying the unique combinations of video (content) sources across the collection of video (content) packages from all the sites. For each unique combination that is identified and comprising a common subset of authorized channels across video packages, a new (unique) code is assigned to it to reduce the total number of codes that must be tracked. Then, as described herein, the provisioning system will receive an old code and translate that code into one or more new codes that deliver authorizations to the STB. These new codes may require more individual codes to the STB, but the overall number of possible codes may be reduced to a manageable number.

Figure 2A:
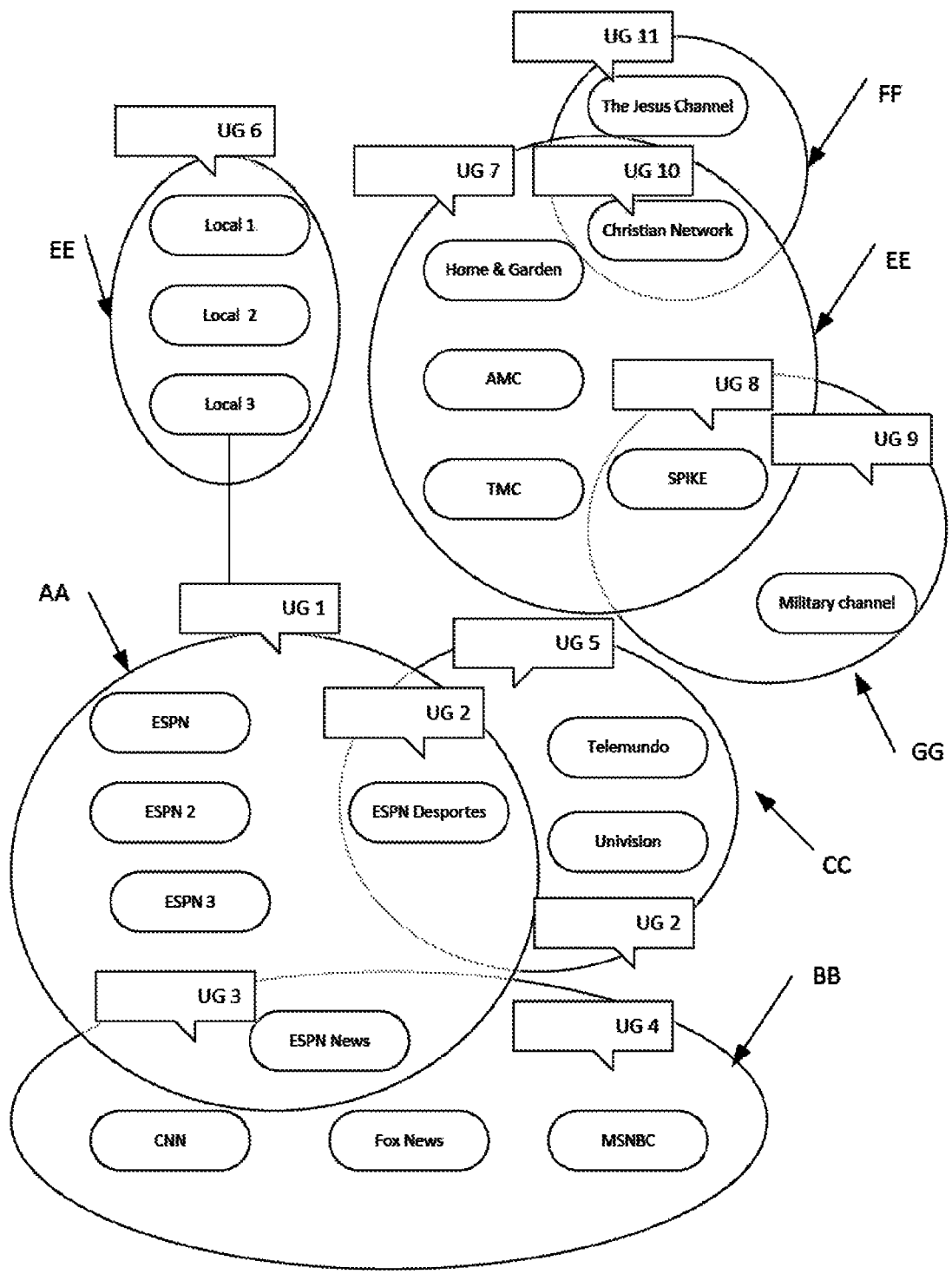

FIGS. 2a-2c demonstrate an implementation example for identifying corresponding overlapping and non-overlapping packages assigned new codes after duplicate packages are identified as described herein in references to FIG. 1a and Table 1. FIG. 2a shows an exemplary diagram demonstrating a concept of finding overlapping sources. Herein, every service code offering is matched with sources (see FIG. 2b), and overlapping sources are identified. Any source(s) that are in the same overlap group may become a unique grouping of source IDs. These can be used to create larger groupings as shown in FIG. 2c.

Thus, packages identified with codes AA, BB, CC, DD, EE, FF and GG in FIG. 2a show a subset of seven original and/or non-duplicate content packages. For example, package AA comprises ESPN, ESPN 2, ESPN 3, ESPN Desportes and ESPN News, package BB comprises CNN, FOX News, MSNBC, ESPN News, and so on, as shown in detail in FIG. 2b. From FIGS. 2a and 2b it is evident, for example, that ESPN News is an overlapping source for the original content packages AA and BB. Similarly, ESPN Desportes is an overlapping source for the original content packages AA and CC, Spike is an overlapping source for the original content packages EE and GG and Christian Network is an overlapping source for the original content packages EE and FF. Also from FIGS. 2a and 2b it is seen that the content package EE does not overlap with any other content package.

Using the above finding about overlapping and non-overlapping packages a plurality of new packages (containing overlapping and non-overlapping sources) assigned with a plurality of new (unique) codes can be formed, where each new content package having a new code, and the plurality of new content packages (G1-G11) comprise content packages having only overlapping sources such as UG 2, UG 3, UG 8 and UG 10 in FIG. 2c, and content packages having only non-overlapping sources such as UG1, UG 4-UG7, UG 9 and UG 11 in FIG. 2c.

In other words, once the unique groupings (UG) are defined as shown in FIG. 2c, they can be combined to recreate the service codes that represent any of a complete set of original content packages AA-GG offered to users. For example, if the original content package AA is provided to a user, in updated system this code/package can be represented by three codes UG 1, UG 2 and UG 3. Similarly, the original content package EE package can be represented by three codes UG 7, UG 8 and UG 10, the original content package GG package can be represented by two codes UG 8 and UG 9, etc.

Figure 3:
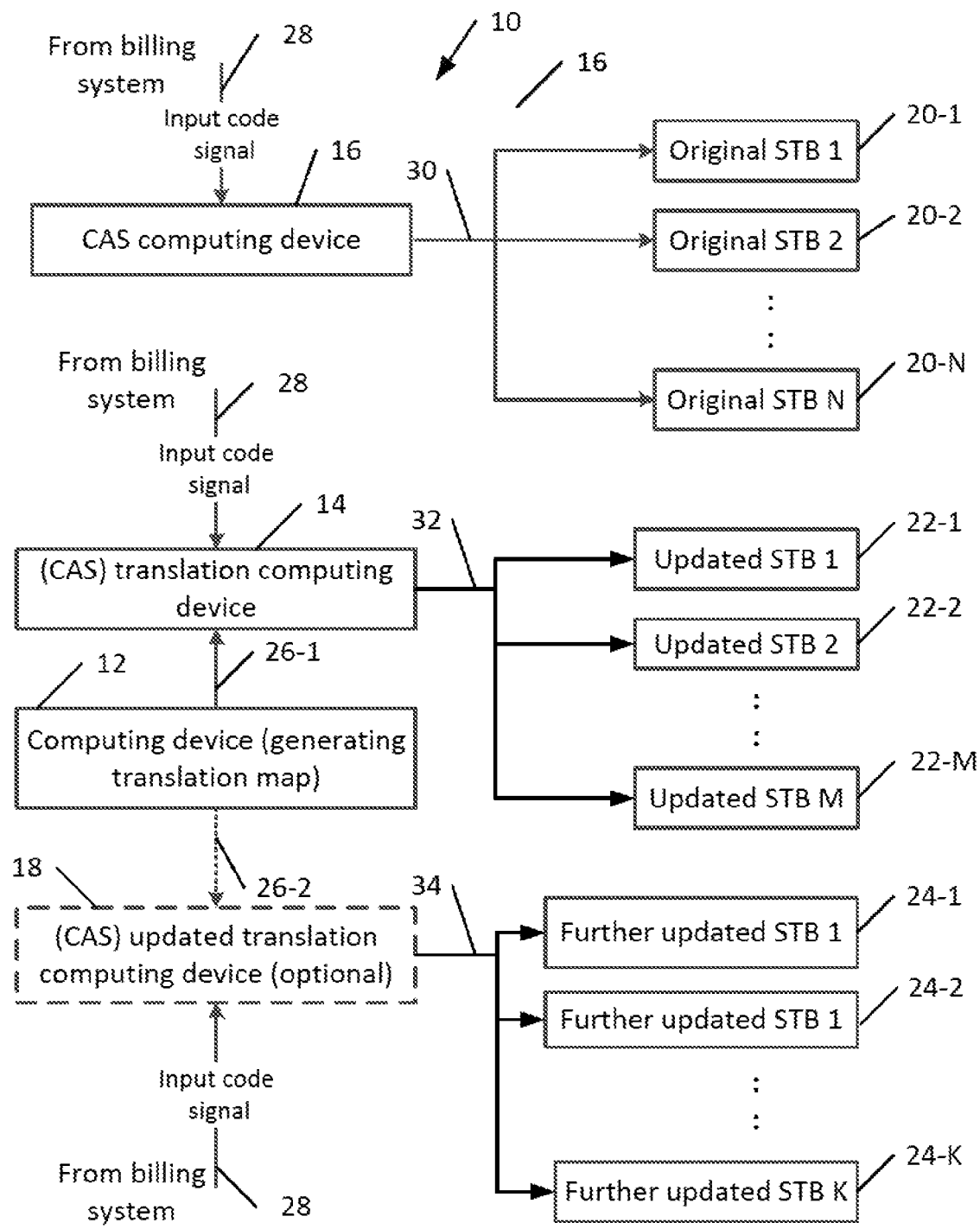
FIG. 3 is a simplified block diagram of a system such as a content provider for providing content packages to users, according to one embodiment.

FIG. 3 shows a simplified block diagram of a system (content provider) 10 with various electronic devices/components suitable for practicing the exemplary embodiments described herein. A computing device 12 can generate a translation map and an updated translation map between the plurality of original and non-duplicate content packages assigned with the plurality of original codes and reference codes, and the plurality of new content packages assigned with the plurality of new codes, as described herein and demonstrated in FIGS. 2a-2c. When new content packages are created after the system is updated, then the process for finding commonalities/overlapping as demonstrated in FIGS. 2a-2c (also see FIG. 4) is repeated.

After generating the unified map comprising at least the first map and the second map as described herein (also see examples of the first and second maps in Table 1 and FIG. 2c, respectively), the computing device 12 sends this unified map (signal 26-1) at least to a translation computing device 14, e.g., supported by a CAS (conditional access system), for storing. Optionally, an updated unified map can be also sent (signal 26-2) by the device 12 to an optional (CAS) translation device 18 for storing as further discussed below.

According to a further embodiment, the CAS (chosen among others may be used in such a way that a billing system can still use the original codes of the original content packages and sends the original code for the corresponding original content package shown as an (input) code signal 28 to both the old and new conditional access system (CAS) represented by a CAS computing device 16 and the CAS translation computing device 14 respectively, as shown in FIG. 3. It is noted that the CAS is one successfully used for billing. Also, for example an electronic program guide (EPG) can be also utilized, since the EPG uses the codes to properly display what the user subscribed too. There may be other mechanisms used to display to a customer/user what is available to them as well.

The (CAS) computing device 16 (old CAS) can use the original codes in a conventional way the way and deliver the code comprised in the signal 28 (see signal 30) to any of original STBs 20-1, 20-2, . . . , 20-N (N being a finite integer of one or more) to get permission for decrypting information received from any of the plurality of sources comprised in the original content package (identified by the code signal 28) and provided by the content provider 10.

The (CAS) transitional computing device 16 (new CAS) can look up, using the unified map stored in the device 16, the grouping of channels that would make up the same offer as the original content package (identified by the code signal 28) thus determining multiple new codes for the multiple new content packages, where the multiple new content packages together comprise the same sources as the original content package (identified by the code signal 28). Then the determined multiple new codes are provided (signal 32) to any of updated STBs 22-1, 22-2, . . . , 22-M (M being a finite integer of one or more) to get permission for decrypting information received from any of the plurality of sources comprised in the determined multiple new content packages and provided by the content provider 10.

According to a further embodiment, the unified map may be periodically updated, so that the computing device 12 can periodically update the corresponding maps (see signals 26-1 and 26-2) after a certain time collapsed or after significant marketing changes in the plurality of content packages offered to the users. The (CAS) updated translation computing device 18 can be optionally used after reaching a threshold operating capacity by the device 14 after multiple map updates. Then the optional device 18 can operate the same way as the device 14 by using latest unified map updates and providing determined multiple new codes (signal 34) to any of updated STBs 24-1, 24-2, . . . , 24-K (K being a finite integer of one or more) to get permission for decrypting information received from any of the plurality of sources comprised in the multiple new content packages and provided by the content provider 10.

It is further noted that FIG. 3 shows three types of STBs installed in different user sites: the original STBs 20-1, 20-2, . . . , 20-N, the updated STBs 22-1, 22-2, . . . , 22-M and the further updated STBs 24-1, 24-2, . . . , 24-K. The original STBs 20-1, 20-2, . . . , 20-N are installed presumably at the start of the service provider service. The updated STBs 22-1, 22-2, . . . , 22-M may be installed at a later date when the CAS system reaches its capacity, such that additional mapping is necessary to relieve the system. Similarly further updated STBs 24-1, 24-2, . . . , 24-K may be installed at a further (later) date when the CAS further reaches its capacity using the device 14, such that an additional support (optional device 18) is necessary to provide further translation of original codes.

Moreover, devices 12, 14, 16 and 18 may be located, e.g., at a data center, a head end, a cloud, a back office, a hub, or another network element of a system 10 such as cable provider, satellite provider and/or the like. Also functionality of the devices 14 and 18 may be alternatively implemented by any of the STBs 22-1, 22-2, . . . , 22-N and optionally by any of STBs 24-1, 24-2, . . . , 24-K. Moreover, any of the devices 12, 14, 16 and 18 and/or their functionalities can be combined or partially combined.

Figure 4:
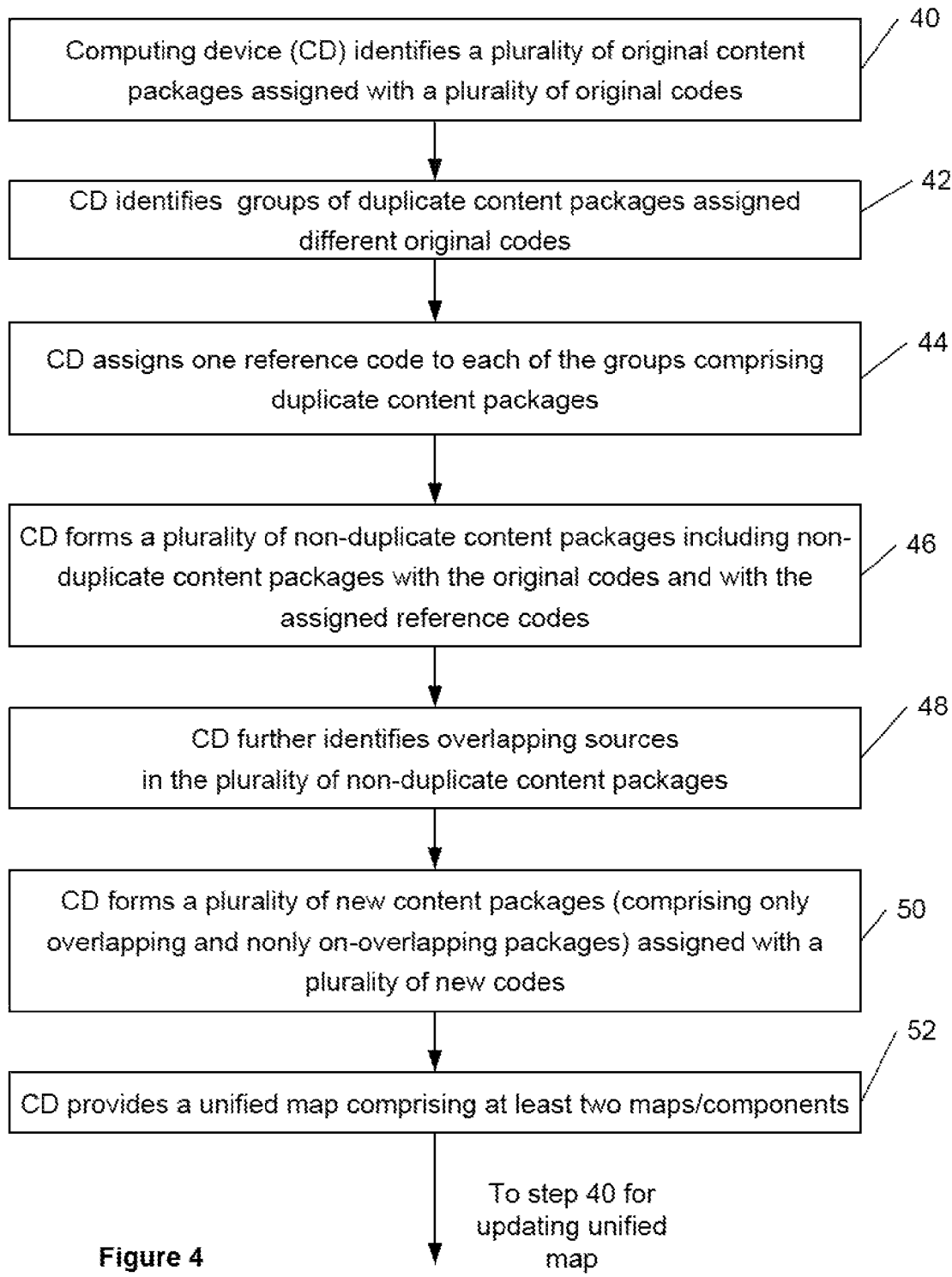
FIG. 4 is a flow chart demonstrating implementation by a computing device of one embodiment described herein.

With reference now to FIG. 4, shown is an exemplary flow chart demonstrating implementation of one embodiment by a computing device (e.g., the device 12 in FIG. 3), as described herein. It is noted that the order of steps shown in FIG. 4 is not required, so in principle, the various steps may be performed out of the illustrated order. Also certain steps may be skipped, different steps may be added or substituted, or selected steps or groups of steps may be performed in a separate application following the embodiments described herein.

In a method according to the embodiment shown in FIG. 4, in a first step 40, a computing device (CD), like the device 12 on FIG. 3, identifies a plurality of original content packages assigned with a plurality of original codes, each original content package having an original code of the plurality of original codes and comprising one or more sources deliverable to users by a content provider such as cable or satellite provider.

In a next step 42, the CD identifies, among the plurality of original content packages, groups of duplicate content packages, where the duplicate content packages being assigned different original codes. In a next step 44, the CD assigns one reference code to each of the groups comprising duplicate content packages, so that all duplicate content packages in each group being assigned only one reference code. In a next step 46, the CD forms a plurality of non-duplicate content packages including non-duplicate content packages with the original codes and with the assigned reference codes.

In a next step 48, the CD further identifies overlapping sources in the formed plurality of non-duplicate content packages.

In a next step 50, the CD forms a plurality of new content packages assigned with a plurality of new codes, where each new content package having a new code and the plurality of new content packages comprise content packages having only identified overlapping sources and content packages having only non-overlapping sources, where each of the new content packages comprises one or more sources from only one original content package.

In a next step 52, the CD provides a unified map which comprises at least two maps: a first map indicating a relationship between the groups comprising duplicate original content packages being assigned different original codes, and the reference codes assigned to the corresponding groups comprising duplicate content packages (see an example in Table 1), and a second map indicating a relationship between the plurality of original and non-duplicate content packages assigned with the plurality of original and reference codes, and the plurality of new content packages assigned with the plurality of new codes (see an example in FIG. 2c).

Figure 5:
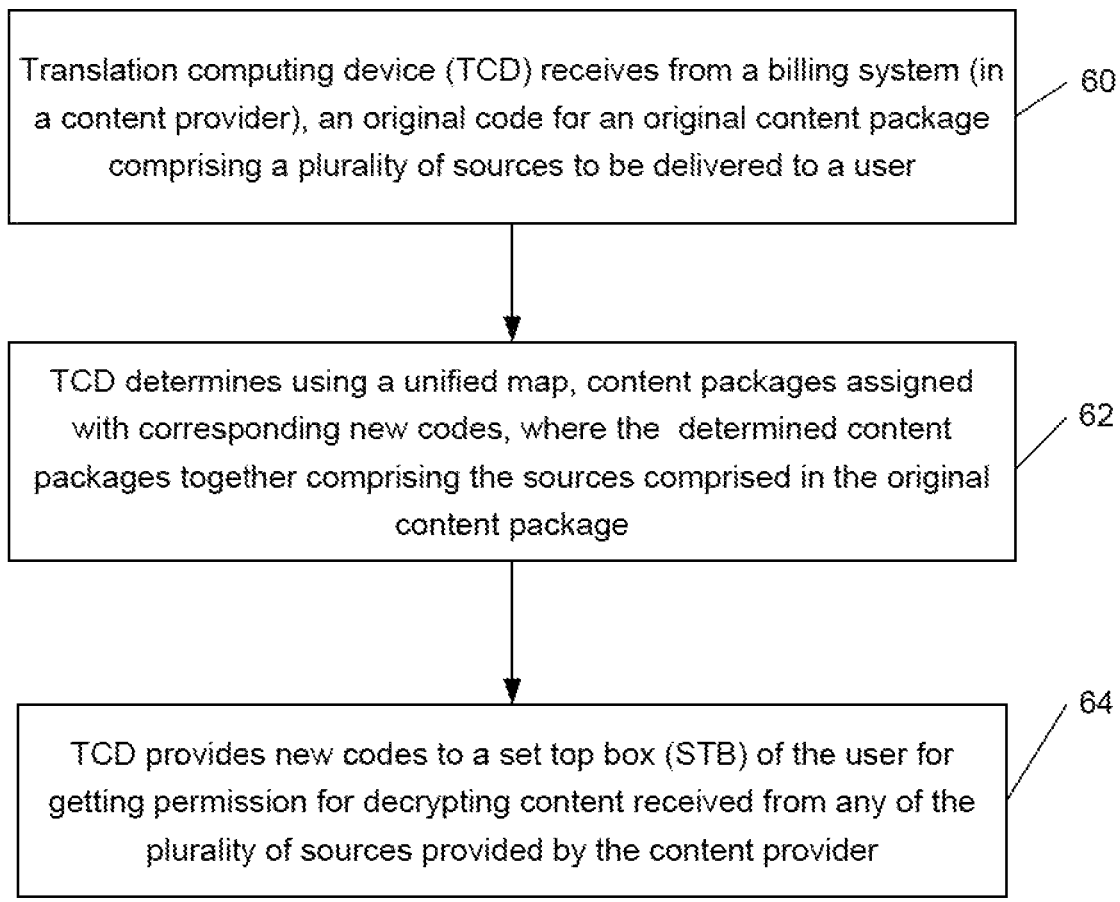
FIG. 5 is a flow chart demonstrating implementation by a translation computing device of another embodiment described herein.

With reference now to FIG. 5, shown is an exemplary flow chart demonstrating implementation of another embodiment by a translation computing device (TCD), e.g., the device 14 or 18 in FIG. 3, as described herein. The TCD may be supported by a CAS (conditional access system), for storing. It is noted that the order of steps shown in FIG. 5 is not required, so in principle, the various steps may be performed out of the illustrated order. Also certain steps may be skipped, different steps may be added or substituted, or selected steps or groups of steps may be performed in a separate application following the embodiments described herein.

In a method according to the embodiment shown in FIG. 5, in a first step 60, the translation computing device (TCD) receives, from a billing system in a content provider, an original code for an original content package comprising a plurality of sources to be delivered to a user;

In a next step 62, the TCD determines, using a unified map, content packages assigned with corresponding new codes out of the plurality of new codes, the content packages being out of a plurality of new content packages, where the content packages together comprising said plurality of sources comprised in the original content package, the unified map comprising at least two maps: a first map indicating a relationship between groups comprising duplicate original content packages being assigned different original codes, and the reference codes assigned to the corresponding groups comprising duplicate content packages, so that all duplicate content packages in each group being assigned only one reference code, and a second map indicating a relationship between a plurality of original and non-duplicate content packages assigned with a plurality of original and reference codes, and the plurality of new content packages (comprising only overlapping or only non-overlapping sources) assigned with the plurality of new codes.

In a next step 64, the TCD provides the corresponding new codes to a set top box (STB) of the user for getting permission for decrypting content received from any of the plurality of sources comprised in the original content package and provided by the content provider.

Figure 6:
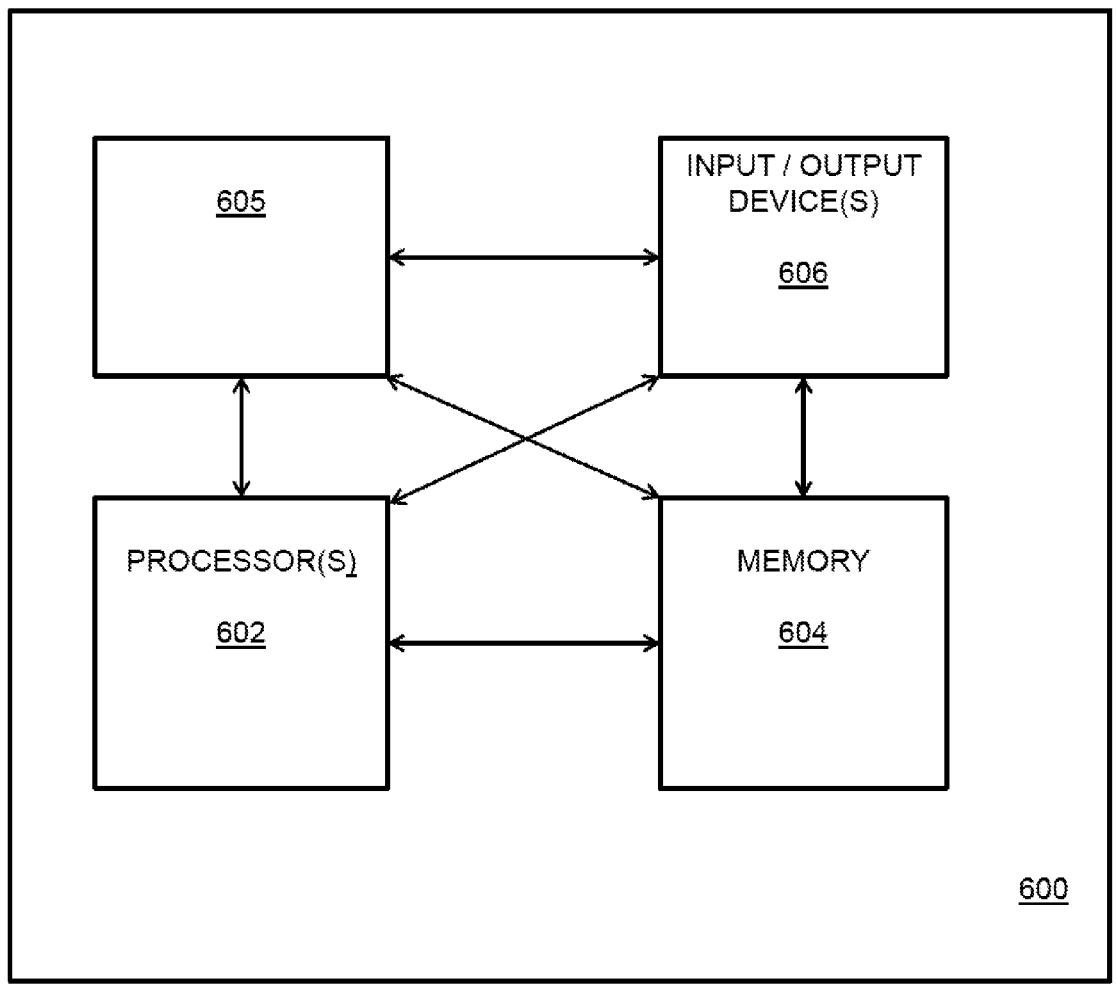
FIG. 6 shows a high-level block diagram of a computer suitable for performing various embodiments described herein.

FIG. 6 depicts a high-level block diagram of a computing device 600 suitable for use in performing various functions described herein with respect to the disclosed embodiments, such for implementing any of devices 12, 14, 16 and 18 as described above with respect to the various figures. FIG. 6 is a simplified block diagram of a computing/electronic device that is suitable for practicing the exemplary embodiments of this invention, and a specific manner in which components of the device are configured to cause that device to operate.

As depicted in FIG. 6, computer (computing device) 600 includes a processor element 603 (e.g., a central processing unit (CPU) and/or other suitable processor(s)), a memory 604 (e.g., random access memory (RAM), read only memory (ROM), and the like), a cooperating module/process 605, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 605 can be loaded into memory 604 and executed by processor 602 to implement the functions as discussed herein. Thus, cooperating process 605 (including associated data structures) can be stored on a computer readable storage medium, e.g., RAM memory, magnetic or optical drive or diskette, and the like.

It will be appreciated that computing device 600 depicted in FIG. 6 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

The various embodiments contemplate an apparatus configured to provide functions in accordance with the various embodiments, the apparatus comprising a processor and a memory communicatively connected to the processor, the processor configured to perform these functions as described above with respect to the various figures.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method performed by a network computing device, comprising:

identifying a plurality of original content packages assigned with a plurality of original codes, each original content package having an original code of the plurality of original codes and comprising one or more sources deliverable to users by a content provider;

identifying, among the plurality of original content packages, groups of duplicate content packages having different original codes and the same one or more sources;

assigning a respective one reference code to each of the identified groups of duplicate content packages;

forming a plurality of non-duplicate content packages including non-duplicate original content packages with the original codes and duplicate content package groups with the assigned reference codes;

identifying, among the formed plurality of non-duplicate content packages, non-duplicate content packages having at least one source overlapping with a source of another non-duplicate content package, and non-duplicate content packages having no source overlapping with a source of another duplicate content package;

forming a plurality of new content packages assigned with a plurality of new codes, where each new content package having a new code and the plurality of new content packages comprise non-duplicate content packages having an overlapping source and non-duplicate content packages having only non-overlapping sources;
providing a unified map comprising a first map indicating a relationship between original codes and assigned reference codes associated with each identified group of duplicate content packages, and a second map indicating a relationship between original codes and assigned new codes associated with non-duplicate content packages, said unified map being configured for delivery by a content provider of corresponding sources to corresponding users using the plurality of new codes;
receiving, from a billing system, an original code for an original content package comprising a plurality of sources to be delivered to a user;
determining, using said map, content packages assigned with corresponding new codes out of the plurality of new codes, said content packages together being out of the plurality of new content packages, where the plurality of content packages comprising said plurality of sources comprised in the original content package; and
providing said corresponding new codes to a set top box (STB) of said user for getting permission for decrypting information received from any of the plurality of sources comprised in the original content package.

2. The method of claim 1, wherein all or selected sources in the plurality of original content packages are video channels.

3. The method of claim 1, wherein one or more sources in the plurality of original content packages are networks.

4. The method of claim 1, wherein said content provider is a cable provider.

5. The method of claim 1, wherein said content provider is a satellite provider.

6. The method of claim 1, wherein said content provider is a combination of cable and satellite providers.

7. The method of claim 1, wherein said computing device is located in a data center, a head end, a cloud, a back office or a hub.

8. The method of claim 1, wherein each of the plurality of original codes and each of the plurality of new codes comprises two alphanumeric characters.

9. The method of claim 1, wherein each of said new content packages comprises one or more sources from only one original content package.

10. A method, comprising:
receiving, by a translation computing device from a billing system in a content provider, an original code for an original content package comprising a plurality of sources to be delivered to a user;
determining, using a unified map, content packages assigned with corresponding new codes out of a plurality of new codes, said content packages being out of a plurality of new content packages, where the content packages together comprising said plurality of sources comprised in the original content package, the unified map comprising at least two maps:
a first map indicating a relationship between groups comprising duplicate original content packages being assigned different original codes, and the reference codes assigned to the corresponding groups comprising duplicate content packages, so that all duplicate content packages in each group being assigned only one reference code, and
a second map indicating a relationship between a plurality of original and non-duplicate content packages assigned with a plurality of original and reference codes, and the plurality of new content packages assigned with the plurality of new codes; and
providing said corresponding new codes to a set top box (STB) of said user for getting permission for decrypting information received from any of the plurality of sources provided by the content provider.

11. The method of claim 10, wherein said translation computing device is located in a data center, a head end, a cloud, a back office or a hub.

12. The method of claim 10, wherein said translation computing device is located in the STB.

13. The method of claim 10, wherein the translation computing device supports a conditional access system (CAS).

14. A network computing device, comprising:
a processor;
a storage medium for tangibly storing thereon program logic for execution by the processor, the program logic comprising:
logic to identify a plurality of original content packages assigned with a plurality of original codes, each original content package having an original code of the plurality of original codes and comprising one or more sources deliverable to users by a content provider;
logic to identify, among the plurality of original content packages, groups of duplicate content packages having different original codes and the same one or more sources;
logic to assign a respective one reference code to each of the identified groups of duplicate content packages;
logic to form a plurality of non-duplicate content packages including non-duplicate original content packages with the original codes and duplicate content package groups with the assigned reference codes;
logic to identify among the formed plurality of non-duplicate content packages, non-duplicate content packages having at least one source overlapping with a source of another non-duplicate content package, and non-duplicate content packages having no source overlapping with a source of another duplicate content package;
logic to form a plurality of new content packages assigned with a plurality of new codes, where each new content package having a new code and the plurality of new content packages comprise non-duplicate content packages having an overlapping source and non-duplicate content packages having only non-overlapping sources;
providing a unified map comprising a first map indicating a relationship between original codes and assigned reference codes associated with each identified group of duplicate content packages, and a second map indicating a relationship between original codes and assigned new codes associated with non-duplicate content packages, said unified map being configured for delivery by a content provider of corresponding sources to corresponding users using the plurality of new codes;
receiving, from a billing system, an original code for an original content package comprising a plurality of sources to be delivered to a user;
determining, using said map, content packages assigned with corresponding new codes out of the plurality of new codes, said content packages together being out of the plurality of new content packages, where the plurality of content packages comprising said plurality of sources comprised in the original content package; and
providing said corresponding new codes to a set top box (STB) of said user for getting permission for decrypting information received from any of the plurality of sources comprised in the original content package.

15. A network computing device, comprising:
a processor;
a storage medium for tangibly storing thereon program logic for execution by the processor, the program logic comprising:
logic to receive, by a translation computing device from a billing system in a content provider, an original code for an original content package comprising a plurality of sources to be delivered to a user;
logic to determine, using a unified map, content packages assigned with corresponding new codes out of a plurality of new codes, said content packages being out of a plurality of new content packages, where the content packages together comprising said plurality of sources comprised in the original content package, the unified map comprising at least two maps:
a first map indicating a relationship between groups comprising duplicate original content packages being assigned different original codes, and the reference codes assigned to the corresponding groups comprising duplicate content packages, so that all duplicate content packages in each group being assigned only one reference code, and
a second map indicating a relationship between a plurality of original and non-duplicate content packages assigned with a plurality of original and reference codes, and the plurality of new content packages assigned with the plurality of new codes; and
logic to provide said corresponding new codes to a set top box (STB) of said user for getting permission for decrypting information received from any of the plurality of sources any of the plurality of sources and provided by the content provider.

16. A non-transitory computer readable storage medium tangibly storing computer program instructions capable of being executed by a computer processor, the computer program instructions defining code for:
a method, comprising:
identifying a plurality of original content packages assigned with a plurality of original codes, each original content package having an original code of the plurality of original codes and comprising one or more sources deliverable to users by a content provider;
identifying, among the plurality of original content packages, groups of duplicate content packages having different original codes and the same one or more sources;
assigning a respective one reference code to each of the identified groups of duplicate content packages;
forming a plurality of non-duplicate content packages including non-duplicate original content packages with the original codes and duplicate content package groups with the assigned reference codes;
identifying, among the formed plurality of non-duplicate content packages, non-duplicate content packages having at least one source overlapping with a source of another non-duplicate content package, and non-duplicate content packages having no source overlapping with a source of another duplicate content package;
forming a plurality of new content packages assigned with a plurality of new codes, where each new content package having a new code and the plurality of new content packages comprise non-duplicate content packages having an overlapping source and non-duplicate content packages having only non-overlapping sources;
providing a unified map comprising a first map indicating a relationship between original codes and assigned reference codes associated with each identified group of duplicate content packages, and a second map indicating a relationship between original codes and assigned new codes associated with non-duplicate content packages, said unified map being configured for delivery by a content provider of corresponding sources to corresponding users using the plurality of new codes;
receiving, from a billing system, an original code for an original content package comprising a plurality of sources to be delivered to a user;
determining, using said map, content packages assigned with corresponding new codes out of the plurality of new codes, said content packages together being out of the plurality of new content packages, where the plurality of content packages comprising said plurality of sources comprised in the original content package; and
providing said corresponding new codes to a set top box (STB) of said user for getting permission for decrypting information received from any of the plurality of sources comprised in the original content package.

17. A non-transitory computer readable storage medium tangibly storing computer program instructions capable of being executed by a computer processor, the computer program instructions defining code for:
method, comprising:
receiving, by a translation computing device from a billing system in a content provider, an original code for an original content package comprising a plurality of sources to be delivered to a user;
determining, using a unified map, content packages assigned with corresponding new codes out of a plurality of new codes, said content packages being out of a plurality of new content packages, where the content packages together comprising said plurality of sources comprised in the original content package, the unified map comprising at least two maps:
a first map indicating a relationship between groups comprising duplicate original content packages being assigned different original codes, and the reference codes assigned to the corresponding groups comprising duplicate content packages, so that all duplicate content packages in each group being assigned only one reference code, and
a second map indicating a relationship between a plurality of original and non-duplicate content packages assigned with a plurality of original and reference codes, and the plurality of new content packages assigned with the plurality of new codes; and
providing said corresponding new codes to a set top box (STB) of said user for getting permission for decrypting information received from any of the plurality of sources provided by the content provider.

* * * * *